United States Patent
Hoglund et al.

(10) Patent No.: US 7,644,869 B2
(45) Date of Patent: Jan. 12, 2010

(54) AUXILIARY STAGE CONTROL OF MULTISTAGE THERMOSTATS

(75) Inventors: Steven R. Hoglund, Minneapolis, MN (US); Patrick C. Tessier, Oakdale, MN (US); Cary Leen, Hammond, WI (US); Kenneth B. Kidder, Coon Rapids, MN (US)

(73) Assignee: Honeywell International Inc., Morristown, NJ (US)

( * ) Notice: Subject to any disclaimer, the term of this patent is extended or adjusted under 35 U.S.C. 154(b) by 537 days.

(21) Appl. No.: 11/306,427

(22) Filed: Dec. 28, 2005

(65) Prior Publication Data

US 2007/0267508 A1 Nov. 22, 2007

(51) Int. Cl.
F24F 7/00 (2006.01)

(52) U.S. Cl. .................. 236/49.1; 236/46 R; 236/46 C; 62/157

(58) Field of Classification Search ............... 236/46 C, 236/46 R, 91 R, 91 D, 91 F, 1 B, 1 C, 49.1, 236/2, 44, 45; 454/370; 62/157, 129, 158
See application file for complete search history.

(56) References Cited

U.S. PATENT DOCUMENTS

| | | | |
|---|---|---|---|
| 4,172,555 A | 10/1979 | Levine | |
| 4,230,267 A | 10/1980 | Dotschkal et al. | |
| 4,265,298 A | 5/1981 | Sumner, Jr. et al. | |
| 4,265,299 A | 5/1981 | Harnish | |
| 4,266,599 A | 5/1981 | Saunders et al. | |
| 4,269,261 A | 5/1981 | Kountz et al. | |
| 4,442,972 A | 4/1984 | Sahay et al. | |
| 4,522,336 A | 6/1985 | Culp | |
| 4,620,668 A | 11/1986 | Adams | |
| 4,702,305 A * | 10/1987 | Beckey et al. | 165/239 |
| 4,702,413 A | 10/1987 | Beckey et al. | |
| 4,706,882 A | 11/1987 | Barnard | |
| 4,828,016 A * | 5/1989 | Brown et al. | 165/239 |
| 5,022,460 A | 6/1991 | Brown | |
| 5,219,119 A | 6/1993 | Kasper et al. | |
| 5,224,629 A * | 7/1993 | Hsich | 222/137 |
| 5,270,952 A | 12/1993 | Adams et al. | |
| 5,555,927 A | 9/1996 | Shah | |
| 5,622,310 A * | 4/1997 | Meyer | 236/46 R |
| 5,803,357 A * | 9/1998 | Lakin | 236/78 B |

(Continued)

OTHER PUBLICATIONS

White-Rodgers, "1F83-277 Heating and Air Conditioning Non-programmable, Auto Changeover, Multi-Stage/Heat Pump Thermostat, Installation Instructions," 10 pages, prior to Dec. 28, 2005.

*Primary Examiner*—Cheryl J Tyler
*Assistant Examiner*—Justin Loffredo

(57) ABSTRACT

Systems and methods for the auxiliary stage control of multistage thermostats are disclosed. An illustrative multistage thermostat for a multistaged HVAC system installed within a building or structure can include a processor having a control algorithm adapted to operate the thermostat in either a normal mode for achieving rapid temperature changes within the building or structure or an economy mode for conserving energy usage. In the economy mode of operation, the thermostat can be configured to determine a target time for achieving a temperature setpoint by either delaying or suppressing activation of the system's auxiliary stage. The target time can be adjusted in part based on the past usage characteristics of the auxiliary stage, the behavior of the user, and/or the progress of the primary stage in achieving the setpoint change without operating the auxiliary stage.

25 Claims, 12 Drawing Sheets

U.S. PATENT DOCUMENTS

| | | | |
|---|---|---|---|
| 5,924,486 A * | 7/1999 | Ehlers et al. ................. 165/238 |
| 6,230,979 B1 * | 5/2001 | Vendt et al. .................... 236/11 |
| 6,315,211 B1 | 11/2001 | Sartain et al. |
| 6,874,693 B2 | 4/2005 | Readio et al. |
| 2002/0134849 A1 * | 9/2002 | Disser ......................... 236/47 |
| 2004/0193324 A1 * | 9/2004 | Hoog et al. .................. 700/276 |

\* cited by examiner

AUXILIARY STAGE CONTROL OF MULTISTAGE THERMOSTATS

FIELD

The present invention relates generally to the field of HVAC systems. More specifically, the present invention pertains to systems and methods for the auxiliary stage control of multistage thermostats.

BACKGROUND

Multistage thermostats are sometimes used to control HVAC systems equipped with a primary stage that can be used for heating or cooling during periods of normal operation and one or more auxiliary stages that can be used for heating or cooling during periods of high demand. In some residential heating systems, for example, such multistage thermostats can be used to control a heat pump having a compressor that operates as the primary heating stage during normal operation and an auxiliary stage heater that can be activated during periods of peak-demand for secondary heating. Such auxiliary stage heating may occur, for example, in response to a step change increase in the temperature setpoint entered by a user, or when the heat pump is unable to supply adequate heat to maintain the building at a certain temperature.

Typically, the auxiliary stage heater will comprise an electric-based component that is more expensive to operate than the primary stage component, which is usually gas powered or a higher-efficiency electric system. Some examples of common auxiliary heating sources can include resistance heater strips, electric-powered furnaces, fossil fuel furnaces (e.g. fuel oil, propane or natural gas furnaces), as well as other sources. Although often capable of quickly generating heat, such auxiliary stage sources typically consume more power than the primary stage source.

For many multistage thermostats, a step change increase in temperature setpoint typically creates an increased demand on the HVAC system, causing the thermostat to turn on the auxiliary stage either immediately when the new setpoint is received from the user, or at a later time once a predetermined period of time has elapsed without achieving the new setpoint. While activating the auxiliary stage results in achieving the new setpoint more quickly, such activation increases energy usage and is thus less efficient. A tradeoff therefore exists in many multistage HVAC systems between comfort and energy conservation.

SUMMARY

The present invention pertains to systems and methods for the auxiliary stage control of multistage thermostats. An illustrative multistage thermostat controller for controlling a multistaged HVAC system installed within a building or structure can include a processor equipped with a control algorithm adapted to run the controller in either a normal mode of operation for achieving rapid temperature changes or an economy mode of operation for conserving energy. In heating systems having both a primary heating stage and an auxiliary heating stage, for example, the thermostat controller can be configured to determine a target time for achieving any temperature setpoint changes made, and then attempt to achieve that target time while delaying or suppressing activation of the auxiliary stage in order to conserve power. The multistage thermostat controller can comprise either a non-programmable or programmable thermostat, and can be equipped with an interface to receive inputs or commands from a user or from another connected controller. A memory unit can be further provided for storing various data, including the past usage characteristics of the primary and/or auxiliary stages as well as any inputs or commands received from the user or other controller.

An illustrative method of controlling a multistaged HVAC system using a thermostat controller can include the steps of receiving a temperature setpoint to adjust the temperature within the building or structure, sensing the temperature within the building or structure and activating the primary stage if the sensed temperature is different than the temperature setpoint, determining a target time to reach the temperature setpoint, and then achieving the temperature setpoint at or near the target time while also delaying or suppressing activation of the auxiliary stage. The target time to achieve the temperature setpoint can be based on a number of factors including the sensed temperature outside of the building or structure, the past usage characteristics of the auxiliary stage, and/or the past behavior of the user. In one embodiment, the target time can be determined in part by computing a setup amount parameter representing the difference between the temperature setpoint and the current sensed temperature within the building or structure, and then computing an auxiliary ramp rate parameter representing an estimate of the heating or cooling capacity of the primary and auxiliary stages.

In some embodiments, the thermostat controller can be configured to determine whether to delay or suppress activation of the auxiliary stage based on the amount of progress at which the system reaches the target time using only the primary stage. Once a temperature setpoint change has been received, the thermostat controller can be configured to immediately activate only the primary stage, sense the temperature change within the building or structure over a period of time due to the activation of the primary stage, and then compare a temperature change parameter computed against a minimum progress parameter to determine if and when to activate the auxiliary stage.

DETAILED DESCRIPTION

The following description should be read with reference to the drawings, in which like elements in different drawings are numbered in like fashion. The drawings, which are not necessarily to scale, depict selected embodiments and are not intended to limit the scope of the invention. Although examples of systems and methods are illustrated in the various views, those skilled in the art will recognize that many of the examples provided have suitable alternatives that can be utilized. Moreover, while the various views are described specifically with respect to multistaged heating systems, it should be understood that the systems and methods described herein could be applied to the control of multistaged cooling systems as well as other types of HVAC and non-HVAC systems, if desired.

Figure 1:
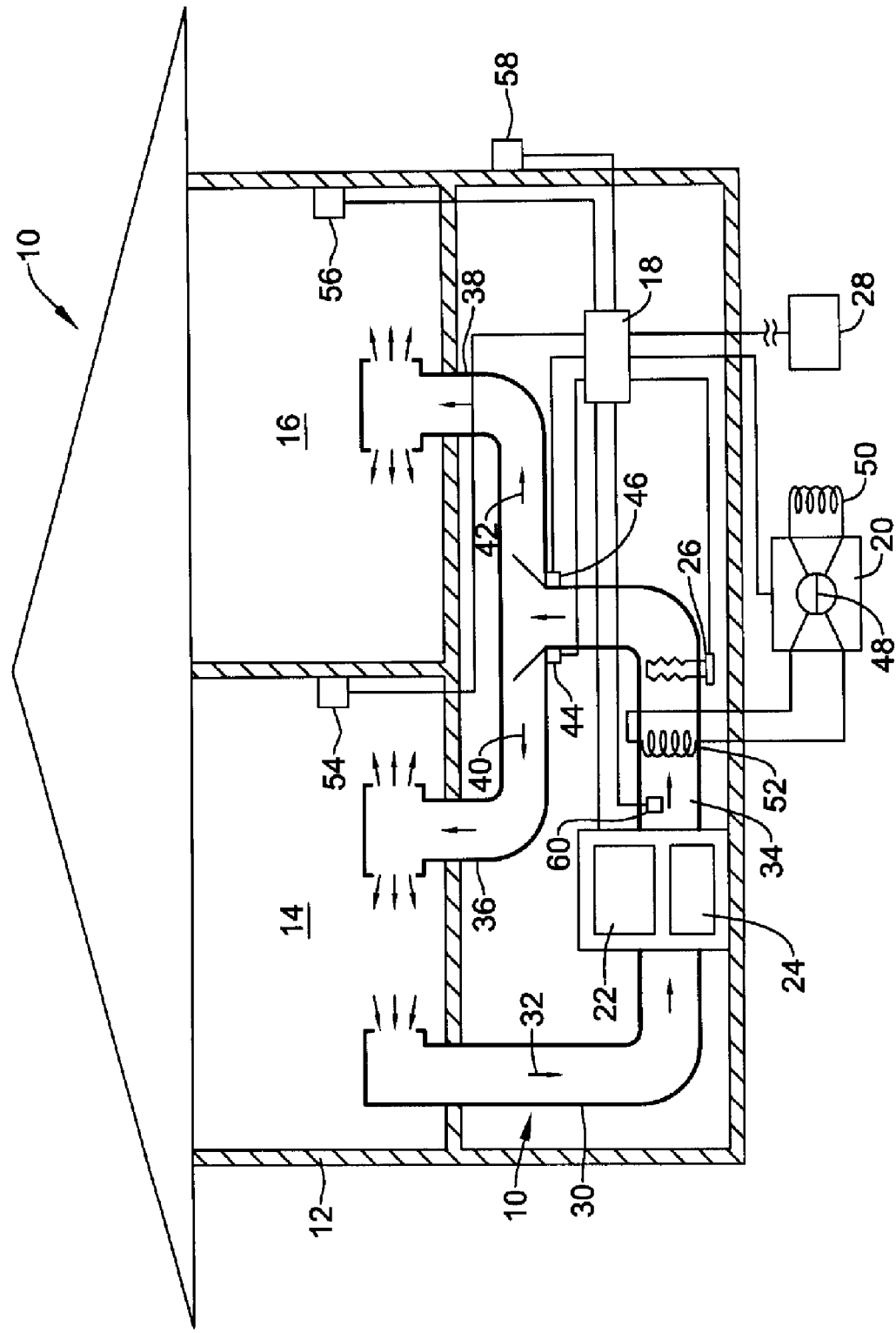
FIG. 1 is a schematic view showing an illustrative multistaged HVAC system.

Referring now to FIG. 1, a schematic view showing an illustrative multistaged HVAC system 10 for use in controlling the temperature within a building 12 will now be described. The HVAC system 10, illustratively a zoned system, can include a first controlled zone 14 and a second controlled zone 16 contained within the building 12. A thermostat controller 18 can be tasked to control a number of heating and/or cooling components, including a heat pump 20, a furnace/air conditioner 22, an air blower 24, and an auxiliary heating source 26 such as an electrical resistance heater strip. In some embodiments, for example, the thermostat controller 18 can comprise a non-programmable electronic thermostat that can be used to provide multistaged heating and/or cooling within the building 12 based on a desired temperature setpoint entered by a user and/or from signals received from another connected controller 28. Alternatively, and in other embodiments, the thermostat controller 18 can comprise a programmable setback thermostat that can be used to provide multistaged heating and/or cooling within the building 12 based on a programmed setpoint schedule or other control routine. In either embodiment, the thermostat controller 18 can be included in a single enclosure or housing mounted to a wall, cabinet, or other such access point within the building 12.

An air intake 30 of the furnace/air-conditioner 22 can be configured to receive air from one or more of the zones 14,16 within the building 12. As shown in FIG. 1, for example, the air intake 30 can include a duct configured to receive air 32 from the first zone 14. If desired, other air intake ducts can be provided to receive air from other zones within the building 12 such as the second zone 16. A main exhaust duct 34 of the furnace/air-conditioner 22, in turn, can be connected to a number of discharge vents 36,38, which discharge conditioned air 40,42 into one or more of the zones 14,16 for heating, cooling and/or ventilating the building 12. The flow of air 40,42 through each of the vents 36,38 can be separately controlled via a number of damper mechanisms 44,46, which in addition to the blower 24, can be utilized to regulate the amount of forced air 40,42 provided to each zone 14,16.

The heat pump 20 can be configured to function as the primary stage for heating and/or cooling the building 12. In the illustrative embodiment of FIG. 1, the heat pump 20 comprises a ground source heat pump which operates to transport heat from the ground into the interior of the building 12 via a liquid/gas state change from a compressor 48 loaded with a refrigerant. The heat pump 20 can include an external heat exchanger 50 and a heat exchange coil 52, which can be configured to provide heating or cooling to each zone 12,14 via the main exhaust duct 34. The compressor 48 for the heat pump 20 can include a number of different compressor stages, which collectively form the primary stage of the pump 20, as discussed herein. While a ground source heat pump 20 is depicted in FIG. 1, it should be understood that other types of heat pumps such as an air-to-air heat pump or a water-to-air heat pump can be utilized to transport heat contained in the outside air or from a water source (e.g. groundwater, a holding pond, etc.) into the interior space of the building 12.

A number of internal air sensors can be used to sense the temperature and/or humidity within one or more of the zones 14,16. In the illustrative embodiment of FIG. 1, for example, a first internal sensor 54 can be used to sense temperature and/or humidity within the first zone 14 whereas a second internal sensor 56 can be used to sense temperature and/or humidity within the second zone 16. While one sensor 54,56 is shown provided for each zone 14,16 located within the building 12, other configurations in which only a single sensor is used for multiple zones, or, alternatively, multiple sensors are used for a single zone can be implemented. If desired, one or more other sensors may be provided in one or more of the zones 14,16 for sensing other parameters within the building 12 and/or to detect the presence of specific gasses (e.g. carbon monoxide) therein.

An external air sensor 58 can be provided to sense the ambient air temperature and/or humidity outside of the building 12. The external air sensor 58, for example, can be utilized by the thermostat controller 18 to create an efficiency curve relating heat pump efficiency to external temperature and/or humidity. Such information can then be utilized to control the duration of heat pump 20 operation in order to reduce condensation on the pump 20, to control the compressor speed and/or duty cycle of the pump 20, to determine the maximum heat output of the pump 20, or to perform some other desired function. The information from the external air sensor 58 may also be used by the thermostat controller 18 to control various other elements of the system 10 including any auxiliary stages of the heat pump 20 and/or the initiation of a defrost cycle for operating the pump 20 in reverse to heat the external heat exchanger 50 and melt-off any built up frost on the pump 20.

A return air sensor 60 can be used to determine the temperature of the air in the main exhaust duct 34 at or just before the heat pump exchange coil 52. If the air temperature in the exhaust duct 34 is too high, damage to the compressor 48 or other components of the heat pump 20 can result when activated. The return air sensor 60 can thus be used by the thermostat controller 18 to determine whether the heat pump 20 should be disabled in the event the furnace 24 is still in operation or has just been recently shut-down but is still heating the air.

While the thermostat controller 18 is shown in connection with a forced-air system operating with a heat pump 20 as the primary stage, it should be understood that the controller 18 can be used in conjunction with other systems, if desired. Examples of other HVAC and non-HVAC systems can include, but are not limited to 24 VAC systems, central air-conditioning systems, warm air systems, hot water systems, steam systems, radiant heat systems (i.e. in-floor and non-in-floor systems), gravity fed systems, and forced air hydronic systems.

Figure 2:
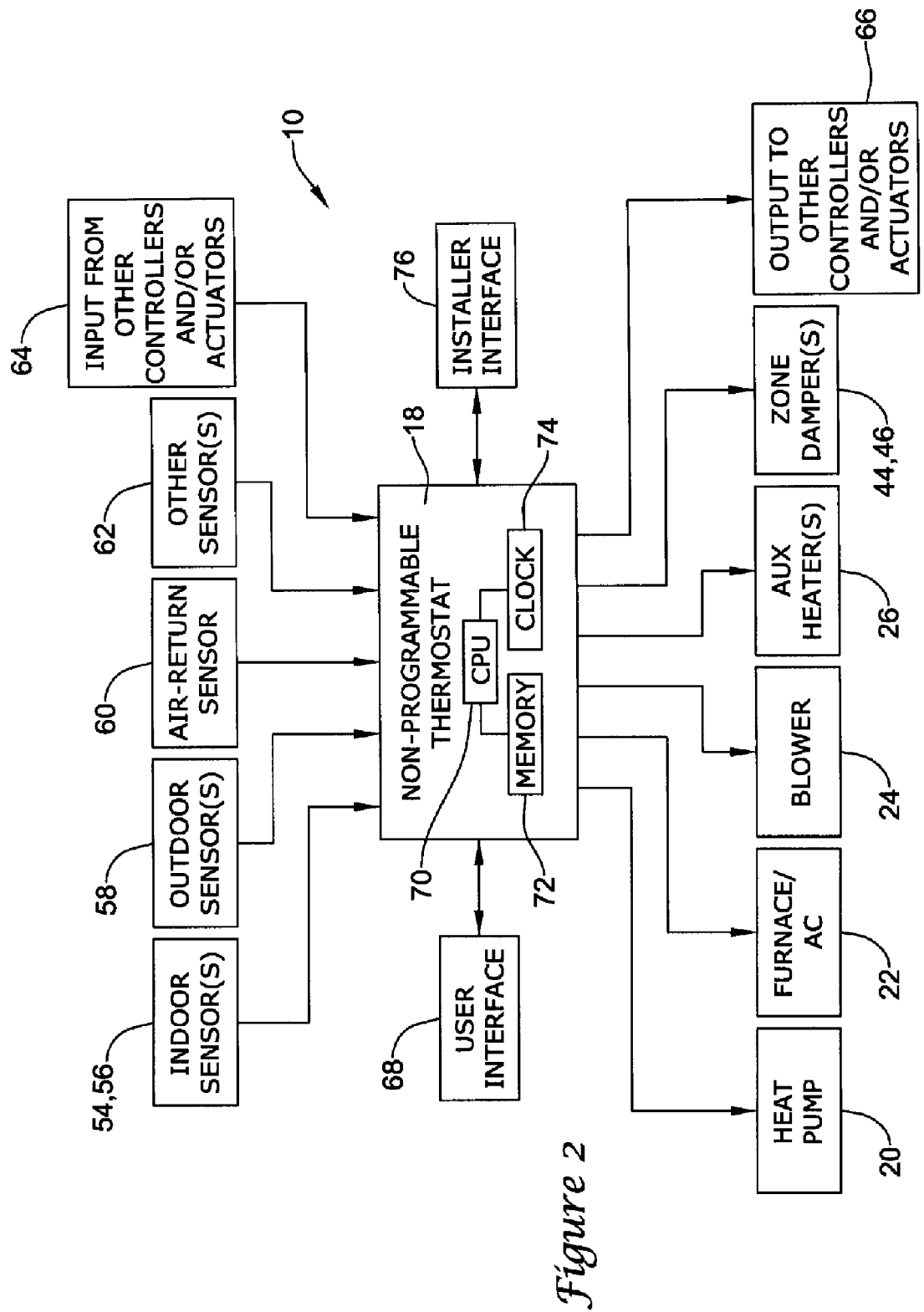
FIG. 2 is a schematic view of a non-programmable thermostat for controlling the illustrative multistaged HVAC system of FIG. 1.

FIG. 2 is a schematic view of a non-programmable thermostat controller 18 for controlling the illustrative multi-staged HVAC system of FIG. 1. As shown in FIG. 2, the thermostat controller 18 can be configured to receive signals from the various indoor and outdoor sensors 54,56,58, the return air sensor 60, as well as any additionally installed sensors 62 used by the system 10. In addition, and as indicated generally by reference number 64, the thermostat controller 18 can also be configured to receive signals from other controllers and/or actuators connected to the system 10, if desired. In some embodiments, for example, the thermostat controller 18 can be configured to receive signals from another connected controller such as a damper controller used to regulate the operation of the zone damper mechanisms 44,46 described above with respect to FIG. 1.

The thermostat controller 18 can be further configured to transmit signals to the various heating, cooling, and ventilation components, including the heat pump 20, the furnace/air-conditioner 22, the blower 24, the auxiliary heating source 26, as well as the zone damper mechanisms 44,46. In some embodiments, and as indicated generally by reference number 66, the thermostat controller 18 can be further configured to output signals to one or more other controllers and/or actuators for controlling other aspects of the system 10, if desired. For example, the thermostat controller 18 can be configured to output control signals to another controller tasked to regulate the temperature and/or humidity within another controlled zone and/or to control the temperature and/or humidity within another building.

The thermostat controller 18 can be equipped with a user interface 68 to permit a user to enter various inputs or commands for setting temperature setpoints. The user interface 68 can include, for example, a dial, rotor, slide, switch, button keypad, touchpad, touchscreen, graphical user interface (GUI), or other means for inputting commands into the thermostat controller 18. In those systems having multiple controlled zones, the user interface 68 can be configured to receive inputs or commands for independently controlling each zone, if desired. With respect to the illustrative system 10 depicted in FIG. 1, for example, the user interface 68 can be configured to accept inputs or commands for controlling the first zone 14 at a different temperature from the second zone 16 based on the user's preferences.

A central processing unit (CPU) 70 within the thermostat controller 18 can be configured to run a control algorithm, which as discussed in greater detail below, can be used to operate the controller 18 in either a normal mode of operation for achieving rapid temperature changes within the building or structure, or an economy mode of operation for conserving energy usage of the auxiliary stage. A memory unit 72 can be provided for storing setpoint values, previously inputted commands, user preferences, as well as various past operating characteristics of the heat pump 20, auxiliary heating source 26 and other system components. A clock 74 can be utilized to log various operational events, including the times in which the heat pump 20 and auxiliary heating source 26 turn on and off, the times in which inputs or commands are received via the user interface 68, as well as the times in which other system events occur.

A separate installer interface 76 can be provided to permit an installer to access various controller functions, including any testing functions programmed within the memory 72 for testing the operation of the thermostat controller 18 and/or any connected system component. In some embodiments, for example, the installer interface 76 can provide a means for the installer to set-up various parameters pertaining to one or more of the system components to be controlled, the number of zones to be controlled, as well as the size and/or type of building or structure to be controlled. Testing algorithms can also be provided to cycle on one or more of the system components in a desired manner.

During operation, the thermostat controller 18 can be configured to regulate the temperature within each zone 14,16 using the heat pump compressor 48 as the primary stage of heating during steady-state conditions, and the auxiliary heating source 26 as an auxiliary stage of heating in those instances where the controller 18 determines that additional heating is desired or where continued operation of the heat pump 20 is inefficient or undesired. The control algorithm for the thermostat controller 18 can be configured to run the thermostat controller 18 in either one of two modes depending on recent input received from the user, past usage characteristics of the system components, the temperature and/or humidity inside the building, the temperature and/or humidity outside of the building, as well as other factors. In a normal mode of operation adapted to achieve a selected temperature setpoint quickly, for example, the thermostat controller 18 can be configured to immediately activate the auxiliary heating source 26 to reduce the overall time required to reach the new setpoint. In an economy mode of operation adapted to conserve energy, the thermostat controller 18 can be tasked to initially activate only the heat pump 20 when a new temperature setpoint is received, and then activate the auxiliary heating source 26 at a later time, if necessary, to reach the new setpoint.

The mode for the thermostat controller 18 can be selected manually via a dial, rotor, slide, switch, button keypad, touchpad, touchscreen, graphical user interface (GUI), or other input means. Alternatively, or in addition, selection of the thermostat mode can be accomplished automatically based in part on the past and present behavior of the user and the past and present performance of the system components. In an automatic mode, for example, the thermostat controller 18 can be configured to switch between the normal and economy modes based on the user's recent inputs stored in memory 72, including, but not limited to, the number of setpoint changes made, the duration or time between each setpoint change, the number of times a setback temperature is selected soon after a higher temperature setpoint is selected, the magnitude or direction of the setback temperature, etc. Other factors such as the sensed indoor and/or outdoor temperature or humidity can also be utilized to determine the operational mode of the thermostat controller 18.

Figure 3:
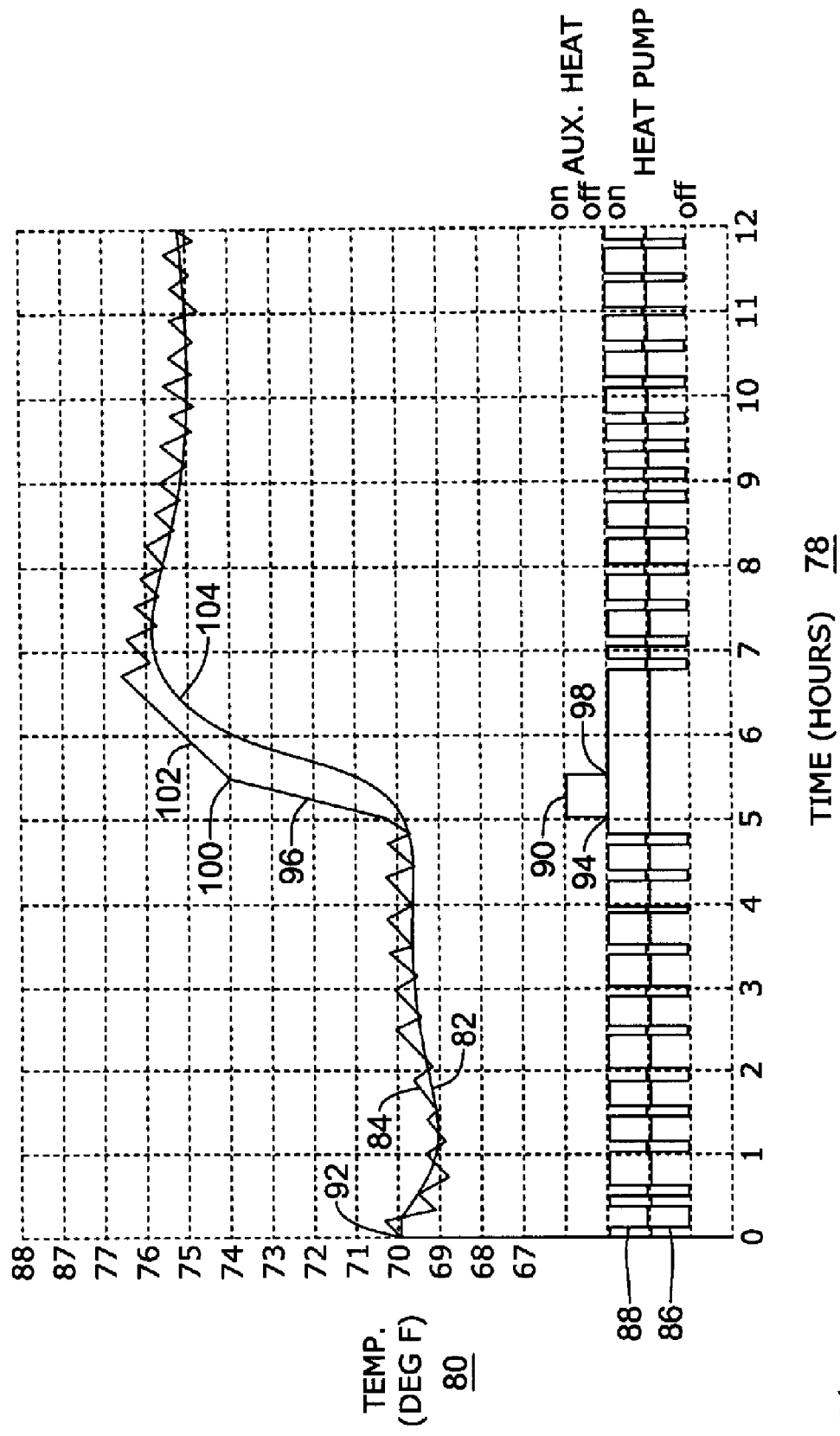
FIG. 3 is a graph showing time versus temperature for an illustrative temperature control cycle operating in a normal mode with auxiliary stage heating.

Referring to FIGS. 3-7, several illustrative graphs showing time 78 versus temperature 80 for a 12-hour temperature control cycle will now be described. In a normal mode of operation first depicted in FIG. 3, the average temperature setpoint maintained within the building is indicated generally by line 82 whereas the sensed temperature within building indicated is indicated generally by line 84. The on/off cycle times for each of the compressor stages of the heat pump 20 during the 12-hour control cycle are indicated generally by lines 86 and 88. The on/off cycle times for the auxiliary heating source 26 during the 12-hour temperature control cycle, in turn, are indicated generally by line 90. In FIG. 3 only a single auxiliary heating source (e.g. auxiliary heating source 26) is shown providing secondary stage heating for the system. It should be understood, however, that one or more additional heating sources can be provided for additional stages of heating, as needed.

As indicated generally at point 92, the temperature setpoint at time=0 hours (e.g. at midnight) is shown maintained in a steady-state condition at about 70° F. At point 94, at approximately 5:00 a.m. in the morning, the temperature setpoint is shown increased by an amount of +5° F., causing the thermostat controller 18 to immediately activate the auxiliary heating source 26, as indicated generally by the upward movement of line 90 at point 94. Activation of the auxiliary heating source 26 may occur, for example, when the user enters a command into the thermostat controller 18 to raise the temperature from the current temperature of 70° F. to a more comfortable temperature of 75° F.

Once both the primary and second heating stages have been activated at point 94, the temperature within the building begins to increase steadily as a result of the additional heating capacity provided by the auxiliary heating source 26. This increase can be seen generally by a first ramp portion 96 of line 84 occurring immediately after the activation of the auxiliary heating source 26. After activation of the auxiliary heating source 26 for a period of time (e.g. about 30 minutes), and as indicated at point 98, the thermostat controller 18 can be configured to shut down the auxiliary heating source 26 as the actual sensed temperature 84 converges with the desired temperature setpoint of 75° F. The effects of this deactivation on the heating rate can be seen at point 100, wherein the rate along a second ramp portion 102 of the line 84 is less than the rate of the first ramp portion 96 thereof based on the reduced heating capacity. Once the system reaches the desired temperature setpoint at about point 104, the thermostat controller 18 can be configured to thereafter cycle the primary heating stage on and off, as needed, in order to maintain the temperature at 75° F.

As can be seen in FIG. 3, a single step change in the temperature setpoint can create a large demand on the system, causing the auxiliary heating stage to immediately turn on and provide the extra heating capacity demanded. While such immediate activation of the auxiliary heating stage decreases the time required to reach the new temperature setpoint, such activity typically results in a higher rate of power usage, reducing the overall efficiency of the system. In some cases, such immediate activation of the auxiliary heating stage may be unnecessary where the user mistakenly inputs a temperature setpoint higher than that actually desired, causing the user to later set back the temperature on the thermostat controller. In addition, such immediate activation may also be unnecessary due to changes in outdoor air temperature that can affect heat capacity. During wake-up periods, for example, such immediate activation of the auxiliary heating stage may be unnecessary since the outside temperature may increase during the morning hours, requiring less heating capacity to heat the building to the new temperature setpoint.

To operate the system in a more energy-efficient manner, the thermostat controller 18 can be configured to operate in an energy-efficient mode in which the activation of the auxiliary heating source 26 is either delayed or suppressed when a new temperature setpoint is selected. In one such energy-efficient mode of operation illustrated in FIG. 4, for example, the system can be configured to reach a step change increase in temperature setpoint without enabling the auxiliary heating stage, thus reducing power consumption and lowering the user's energy bill. When the setpoint change is received at point 94 at approximately 5:00 a.m., the thermostat controller 18 can be configured to compute a setup amount (i.e. $\Delta T \approx +5°$ F.) representing the difference between the new temperature setpoint and the current temperature sensed within the building. A table of times versus temperatures stored within the memory 72 of the thermostat controller 18 or provided from another connected controller can then be used to compute a reasonable target time required to achieve the new temperature setpoint without using the auxiliary stage heating. In some embodiments, for example, the thermostat controller 18 may determine that a reasonable target time for achieving the new temperature setpoint may be at 6:50 a.m., representing a 110 minute change after the temperature setpoint is received.

Figure 4:
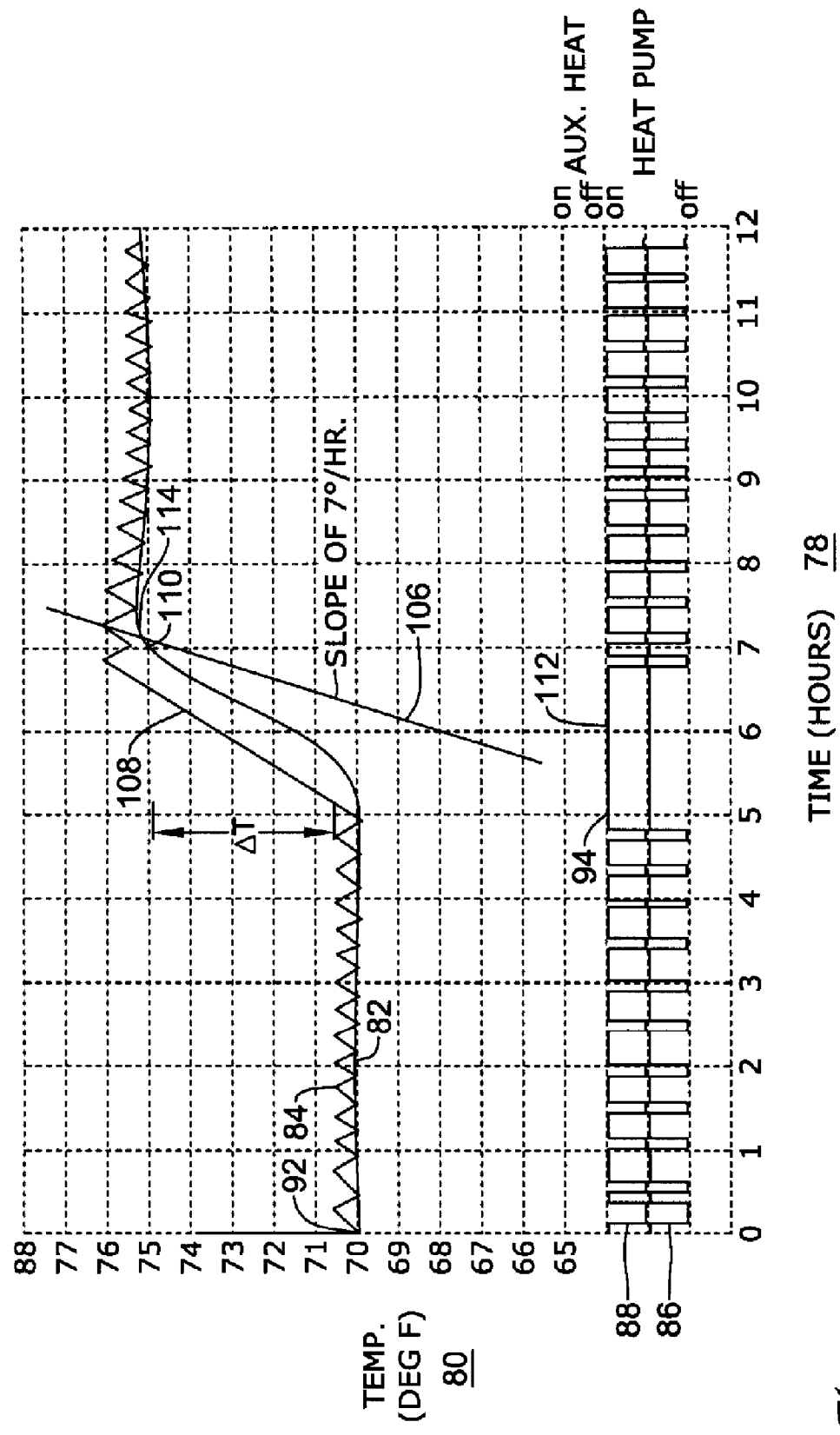
FIG. 4 is a graph showing time versus temperature for an illustrative temperature control cycle operating in an economy mode without auxiliary heating.

As illustrated generally by line 106, a constant auxiliary ramp rate can then be computed from the accessed table of values, which represents an estimate of the degrees per hour of temperature rise that can be achieved when both the primary and auxiliary heating stages are activated in a fully on position. In FIG. 4, for example, the auxiliary ramp rate line 106 is shown having a slope of approximate 7° F. per hour of activation, indicating that the system is capable of achieving an upward temperature change of 7° F. within a one hour period. The slope of the auxiliary ramp rate line 106 will typically vary, however, depending on the heating capability of the primary and auxiliary heating stages, the temperature within the building, the temperature outside of the building, the ventilation rate within the building, the number of air changeovers per hour, as well as other factors.

In the illustrative heating scenario depicted in FIG. 4, as the thermostat controller 18 receives the step change in temperature setpoint at point 94, the control algorithm for the controller 18 can be configured to maintain the auxiliary heating stage in an off position in order to conserve power usage until it is determined that such auxiliary stage heating is required to reach the temperature setpoint within a reasonable target time. The increase in sensed temperature resulting from the operation of only the primary heating stage can be seen generally by ramp portion 108 of line 84, which steadily increases at a rate based on the heating capacity of the primary heating source. In those embodiments where the primary heat source comprises a heat pump, for example, the rate of increase of the ramp portion 108 is dependent in part on the heating capability of the heat pump compressor.

At point 110 where the sensed temperature line 84 intersects the auxiliary ramp rate line 106, the control algorithm for the thermostat controller 18 can be configured to determine whether activation of the auxiliary heating stage is necessary to achieve the temperature setpoint within the target time. If, for example, the sensed temperature line 84 intersects the auxiliary ramp rate line 106 at a point where the difference between the sensed temperature and temperature setpoint is significant, the thermostat controller 18 can be configured to activate the auxiliary heating stage to reach the temperature setpoint more quickly. Conversely, and as shown by segment 112 in FIG. 4, the thermostat controller 18 can be configured to continue operation of only the primary heating stage until the new setpoint is achieved. Once the system reaches the new temperature setpoint at point 114, the thermostat controller 18 can be configured to thereafter cycle the primary heating stage on and off, as needed, in order to maintain the system at steady-state.

Figure 5:
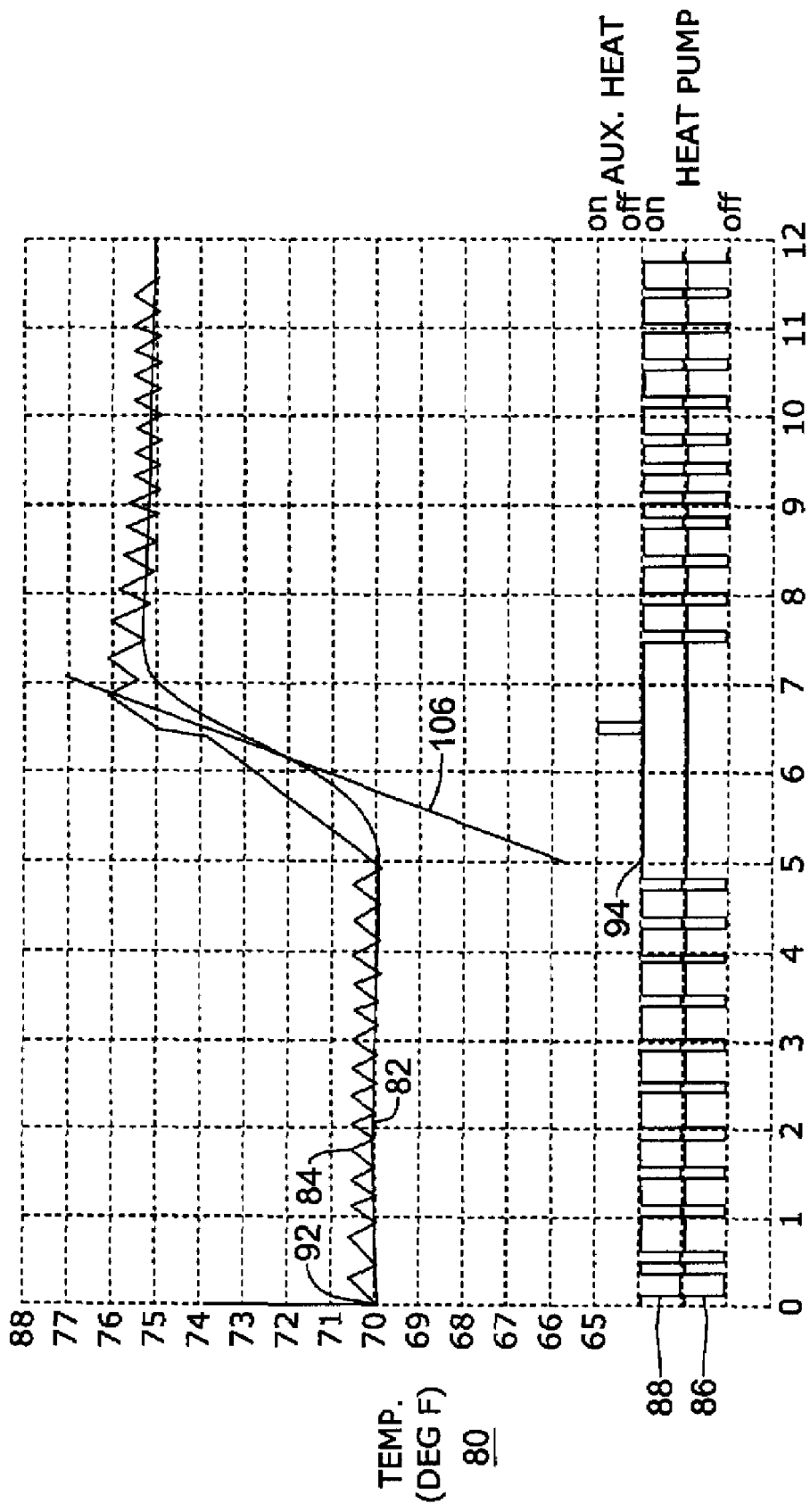
FIG. 5 is a graph showing time versus temperature for an illustrative temperature control cycle operating in an economy mode with auxiliary heating.

FIG. 5 is a graph showing time 78 versus temperature 80 for an illustrative temperature control cycle operating in an economy-mode of operation with auxiliary heating. The graph in FIG. 5 is similar to that depicted in FIG. 4, with like elements labeled in like fashion. In FIG. 5, however, the sensed temperature resulting from the operation of only the primary heating stage is shown increasing at a lower rate, causing line 84 to intersect the auxiliary ramp rate line 106 at a lower temperature. Intersection of the sensed temperature line 84 with the auxiliary ramp rate line 106 may occur at a lower temperature if, for example, the outside building temperature is lower and thus requires greater heating capacity to heat the building. Other factors such as the humidity levels inside and outside of the building, the amount of ventilation occurring within the building, the number of air changeovers per hour within the building, and the heating capacity of the primary heating source may also have an impact on the time required for the sensed temperature line 84 to intersect the auxiliary ramp rate line 106.

Figure 6:
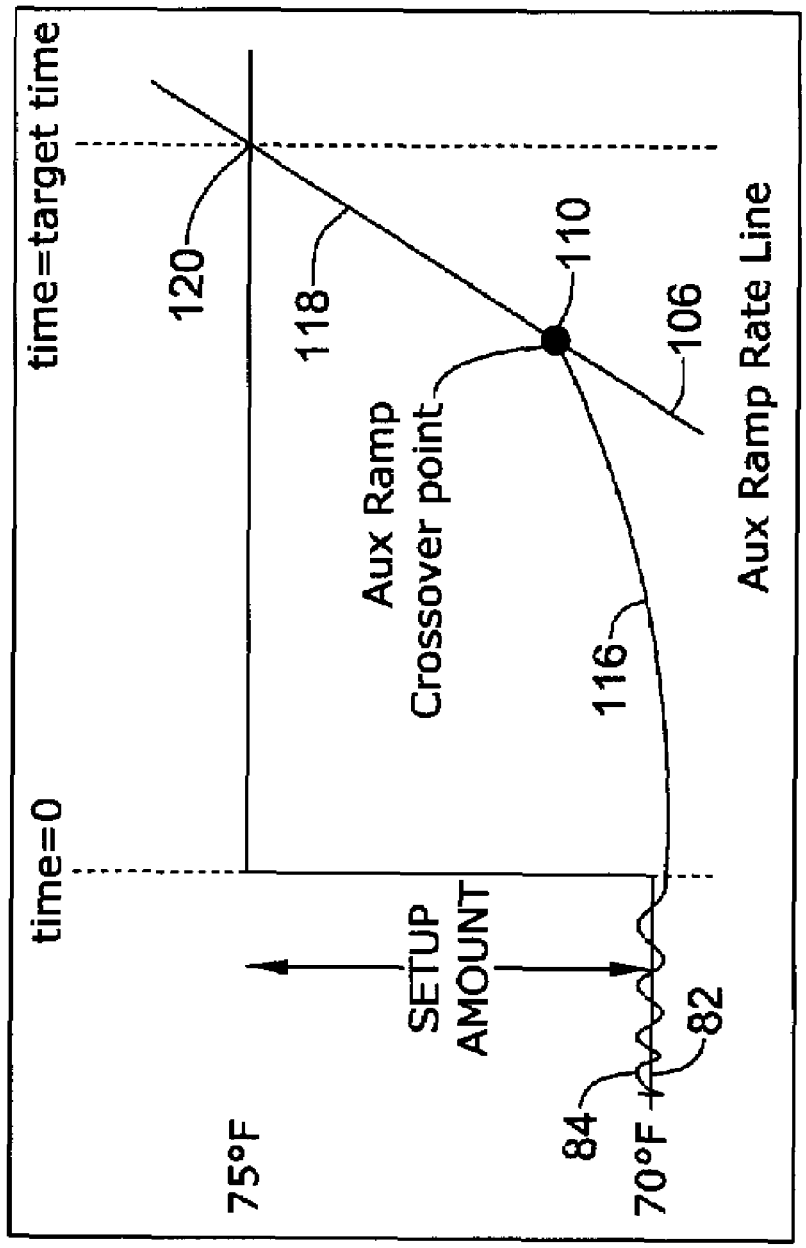
FIG. 6 is a graph showing the auxiliary ramp crossover point for the illustrative temperature control cycle of FIG. 5 in greater detail.

FIG. 6 is a graph showing the auxiliary ramp crossover point 110 for the illustrative temperature control cycle of FIG. 5 in greater detail. As can be further seen in FIG. 6, the sensed temperature within the building steadily increases during a first segment 116 of line 84 beginning at time t=0 after the temperature setpoint change is made and the primary heating stage is turned on. As time progresses, the thermostat controller 18 can be configured to continuously compare the current sensed temperature to the auxiliary ramp rate line 106. At crossover point 110, the sensed temperature line 84 intersects the auxiliary ramp rate line 106, causing the thermostat controller 18 to activate the auxiliary heating stage for the remaining time period in order to reach the new setpoint within the target time. As indicated generally by the second segment 118 of line 84, activation of the auxiliary heating stage causes the rate of temperature increase to approximate the computed auxiliary ramp rate line 106 in order to achieve the temperature setpoint (e.g. 75° F.) within the remaining time. When the system reaches the desired temperature setpoint at point 120, the thermostat controller 18 can be configured to shut-off the auxiliary heating stage, allowing the primary stage to thereafter cycle on or off, as needed, in order to maintain the system at steady-state.

In some embodiments, the thermostat controller 18 can be configured to automatically switch from the economy mode of operation to the normal mode of operation in order to maintain a constant temperature within the building under steady-state conditions. In some applications, for example, where the heat pump 20 is unable to keep up with the demand such as during extremely cold weather or where the heat pump 20 is undersized for the building or structure, the thermostat controller 18 can be configured to function in its normal mode, causing the auxiliary heating stage to turn on immediately rather than being delayed or suppressed, as discussed above. In some circumstances, for example, immediate activation of the auxiliary heat source may be more energy efficient than delaying or suppressing activation thereof. In other circumstances, immediate activation of the auxiliary heat source may be necessary in order to achieve at least a minimum temperature within the building or structure during steady-state conditions.

Figure 7:
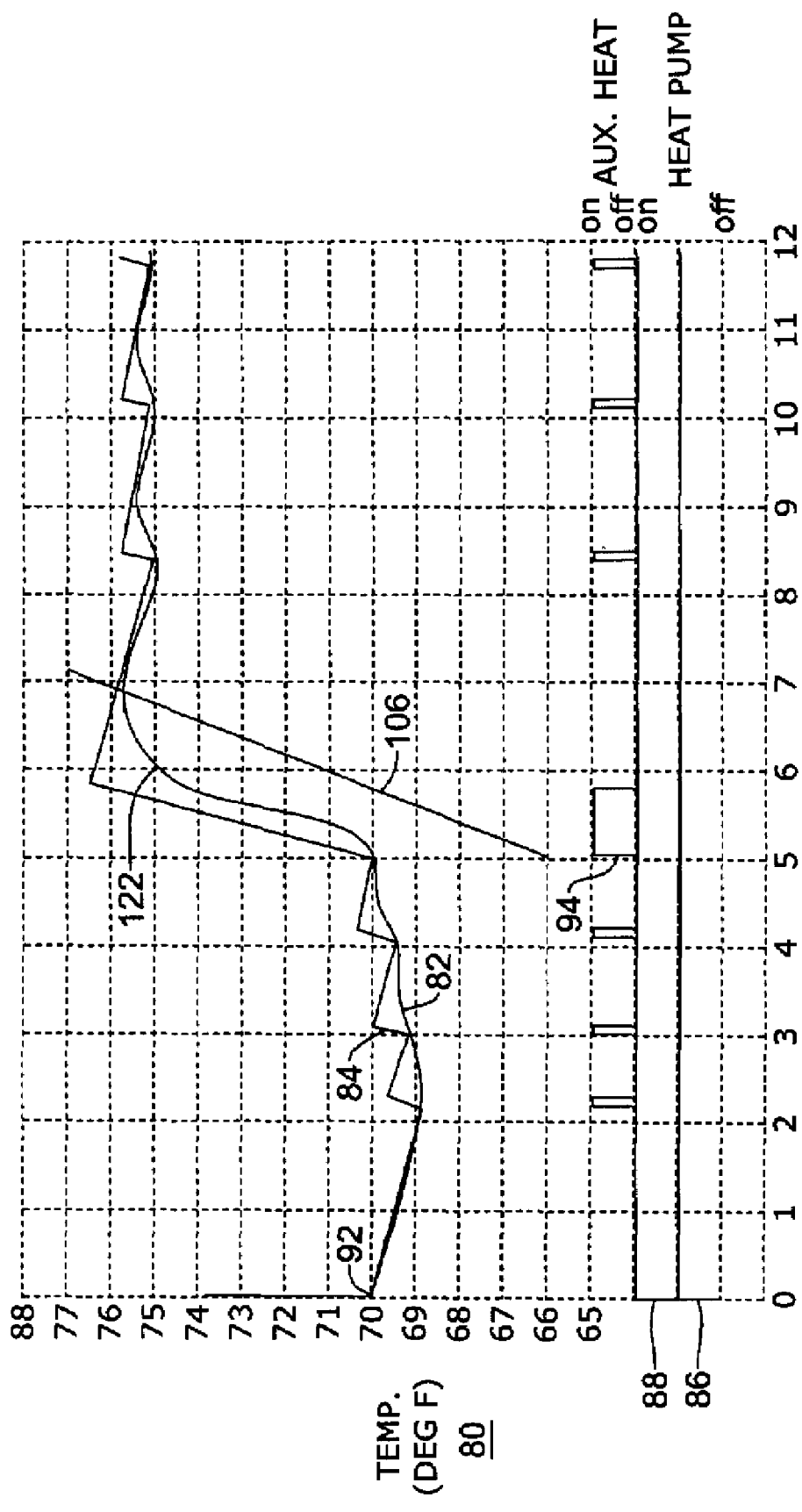
FIG. 7 is a graph showing time versus temperature for an illustrative temperature control cycle dependent in part on prior auxiliary stage usage.

FIG. 7 is a graph showing time 78 versus temperature 80 for an illustrative temperature control cycle in which operation of the system is dependent at least in part on prior auxiliary heating stage usage. As shown in FIG. 7, the primary heating stage can be locked in a constant on position whereas the auxiliary heating source can be cycling on and off, as needed, during normal operation. A timer within the thermostat controller 18 can record the time in which the last auxiliary stage was used. If this time is above a certain threshold time period, the thermostat controller 18 can be configured to operate in its economy mode, as discussed above. Conversely, if the time falls below a certain threshold time period, the thermostat controller 18 can be configured to operate in its normal mode of operation, causing the controller 18 to immediately turn on the auxiliary heating stage when a temperature setpoint change is made.

As illustrated in FIG. 7, for example, when a step change increase in temperature setpoint is received at point 94, the thermostat controller 18 can be configured to automatically activate the auxiliary heating stage and operate in its normal mode. Once the system reaches the new temperature setpoint (e.g. 75° F.) at point 122, the thermostat controller 18 can be configured to shut off the auxiliary heating stage and operate only the primary stage. Continued operation at the new temperature setpoint can then occur in either the economy mode or normal mode, depending on the time period since the last auxiliary stage usage.

Although the determination of whether to operate the thermostat controller 18 in the economy mode or normal mode can be based at least in part on recent activity of the auxiliary stage, the determination of whether to disable the auxiliary stage can also be based on other factors. In one alternative embodiment, for example, the determination of whether to disable the auxiliary stage can be based at least in part on the progress in which the temperature increase occurs within the building during the initial period after the new temperature setpoint is received. Upon receiving the new temperature setpoint, the thermostat controller 18 can be configured to initially disable the auxiliary stage from turning on, allowing the controller 18 to track the progress at which the temperature increase is being made towards the new temperature setpoint.

At a predetermined period of time after the new temperature setpoint has been received, the thermostat controller 18 can then be configured to compare the current sensed temperature against a minimum progress parameter to determine if adequate progress is being made by operating only the primary heating stage. If the progress is deemed adequate, the thermostat controller 18 can be configured to continue to operate the system in the economy mode with the auxiliary heating stage disabled. Conversely, if the progress is determined to be inadequate, the thermostat controller 18 can be configured to discontinue economy mode operation, causing the auxiliary heating stage to activate for a period of time.

Figure 8:
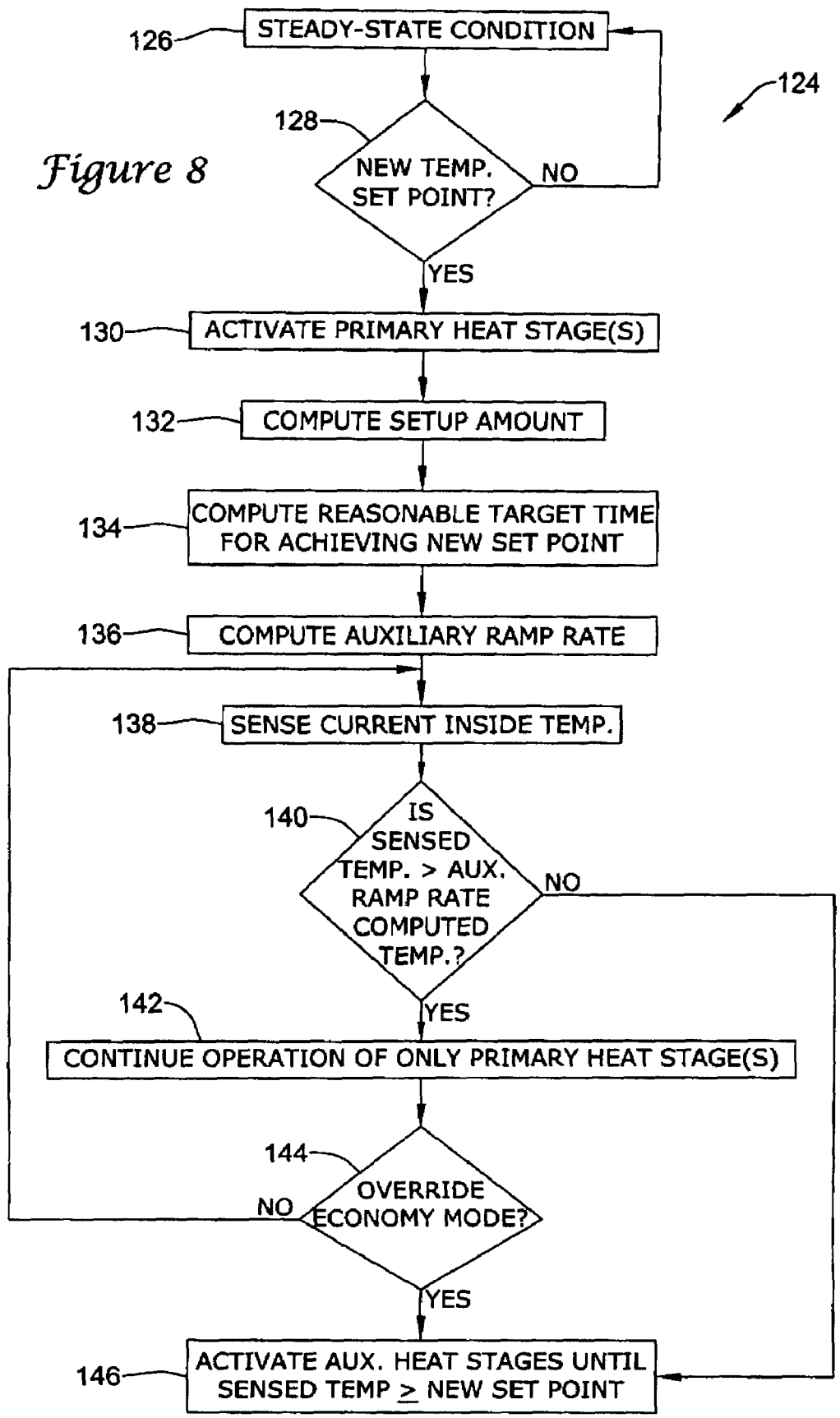
FIG. 8 is a block diagram showing an illustrative method of controlling a multistaged HVAC system in an economy mode of operation.

Referring now to FIG. 8, an illustrative method 124 of controlling a multistaged HVAC system in an economy mode of operation will now be described. Method 124, illustratively a method for controlling a multistaged heating system, may begin at block 126 with the HVAC system operating in a steady-state condition. In some embodiments, for example, block 126 may include the step of activating one or more compressor stages of a heat pump for maintaining a desired temperature within a building or structure. The primary heating stage can operate continuously in an on position, or cycle on/off, as needed, depending on the current temperature setpoint, the sensed temperature within the building, the sensed temperature outside of the building, the heating capacity of the heat pump, as well as other factors.

The control algorithm for the thermostat controller can be configured to determine whether a new temperature setpoint has been received by a user or from another controller, as indicated generally by decision block 128. If no new temperature setpoint has been received, the thermostat controller can be configured to continue steady state operation with only the primary heating stage. If, on the other hand, the thermostat controller receives a signal indicating a new temperature setpoint is desired, the controller can be configured to activate the primary heating stage 130, if necessary, and then compute a setup amount 132 representing the difference between the new temperature setpoint and the current sensed temperature within the building or structure.

As indicated further by block 134, the thermostat controller can also be configured to compute a reasonable target time required for the system to achieve the new setpoint without activating the auxiliary heating stage. In some embodiments, for example, such target time parameter can be determined by recalling a table of times versus temperatures stored within the thermostat controller memory or provided by another controller. In other embodiments, and as discussed herein with respect to FIGS. 10-11, such parameter can also be determined based in part on the previous usage characteristics of the auxiliary heating source during prior setpoint changes and/or from a predicted value based on the change in sensed temperature resulting from activation of only the primary heating source.

Once a setup amount and target time have been computed at blocks 132 and 134, the thermostat controller can be configured to compute an auxiliary ramp rate parameter at block 136 representing an estimate of the heating capability (e.g. ° F./hour) that can be achieved with both the primary and auxiliary heating stages activated in a fully on position. A current measure of the inside temperature within the building can then be made at block 138.

If at decision block 140 the thermostat controller determines that the current sensed temperature is above the auxiliary ramp rate computed temperature, the controller can be configured to continue operation of only the primary heating stage, as indicated generally by block 142. Conversely, if at decision block 140 the thermostat controller determines that the current sensed temperature is not above the auxiliary ramp rate computed temperature, or if an override signal to abort the economy mode of operation is received at block 144, the controller can then be configured to immediately activate one or more of the auxiliary heating stages for a period of time until the sensed temperature within the building or structure is at or above the new temperature setpoint, as indicated generally by block 146. Once the new temperature setpoint has been achieved, the thermostat controller can then be configured to repeat the above steps to adjust the temperature based on any new setpoints received, if desired.

Figure 9A:
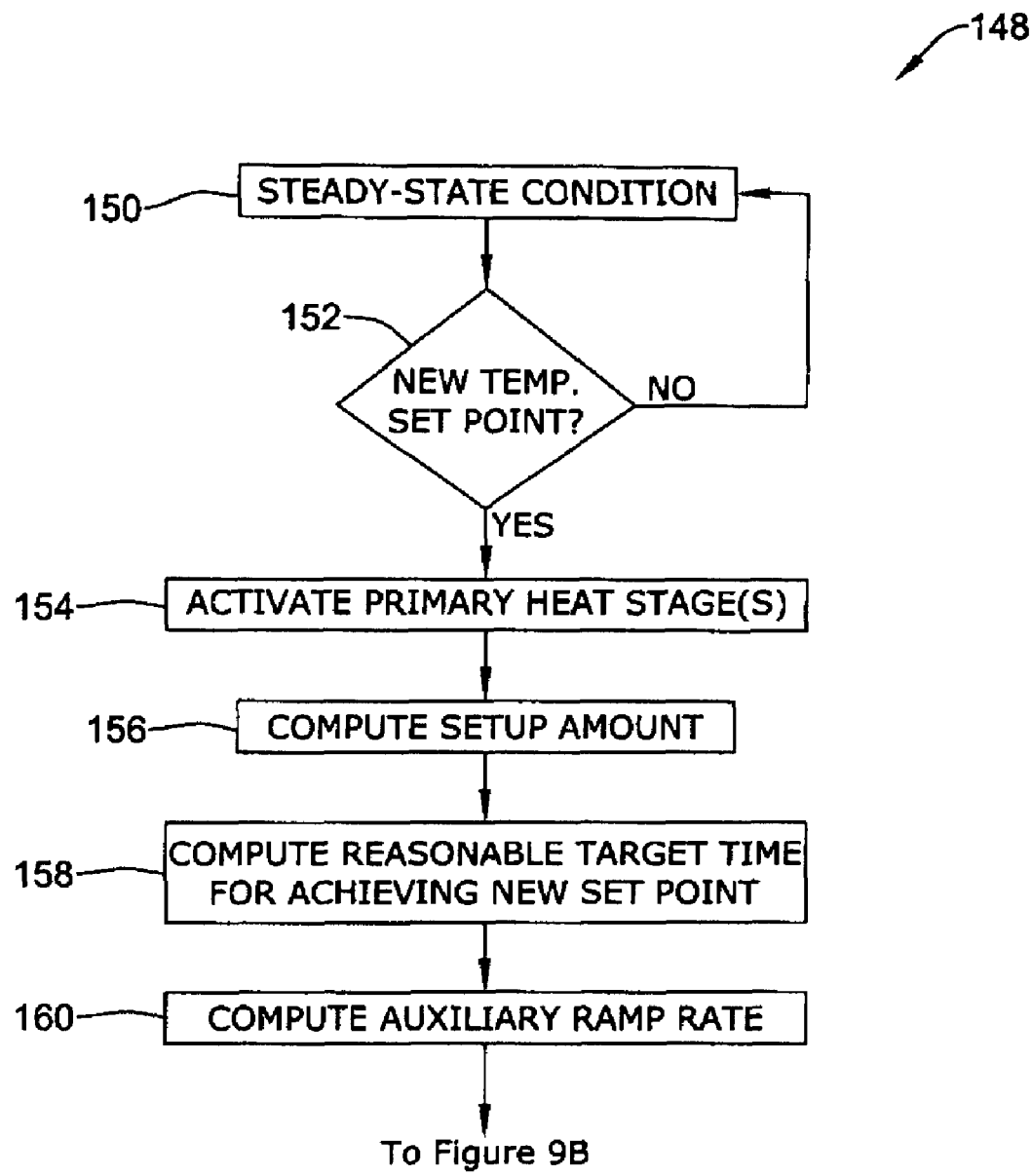
FIG. 9 is a block diagram showing an illustrative method of controlling a multistaged HVAC system in an economy mode of operation based in part on user behavior.
Figure 9B:
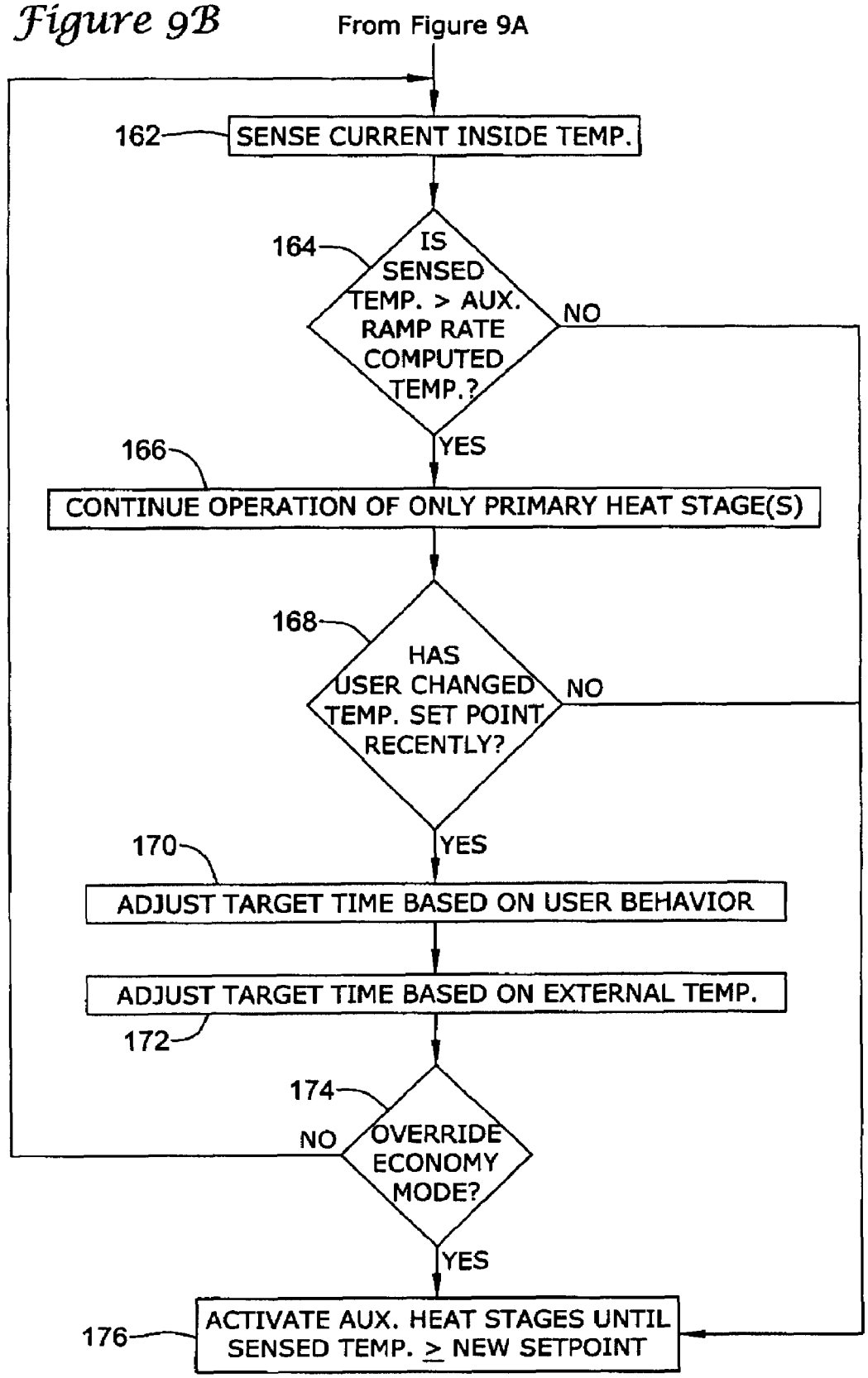

FIG. 9 is a block diagram showing another illustrative method 148 of controlling a multistaged HVAC system in an economy mode of operation based in part on user behavior. As shown in FIG. 9, method 148 may begin at block 150 with the HVAC system operating in a steady-state condition. At decision block 152, if the thermostat controller does not receive a new temperature setpoint, the controller can be configured to continue steady-state operation with only the primary heating stage. Otherwise, if the thermostat controller receives a signal indicating a new temperature setpoint is desired, the controller can be configured to activate the primary heating stage 154, if necessary, and then compute a setup amount 156 and target time parameter 158, similar to that described above with respect to the illustrative method 124 of FIG. 8. Using the computed values obtained at blocks 156 and 158, the thermostat controller can compute an auxiliary ramp rate parameter at block 160 representing an estimate of the heating capacity that can be achieved with both the primary and auxiliary heating stages activated in a fully on position. A current measure of the inside temperature within the building can then be made at block 162.

If at decision block 164 the thermostat controller determines that the current sensed temperature is above the auxiliary ramp rate computed temperature, the controller can be configured to continue operation of only the primary heating stage, as indicated generally by block 166. Otherwise, if at decision block 164 the thermostat controller determines that the current sensed temperature is at or below the auxiliary ramp rate computed temperature, the controller can be configured to immediately activate one or more of the auxiliary heat stages, as indicated generally by block 176.

With only the primary heating stage initially operating at block 166 to conserve energy, the thermostat controller can be configured to monitor the user's behavior to alter the target time in which to reach the new temperature setpoint using the auxiliary heating stage, if necessary. At decision block 168, for example, the thermostat controller can be configured to inquire into whether the user has increased or decreased the temperature setpoint during the active setup condition. Using this information, the thermostat controller can then adjust the target time parameter at which the system attempts to reach the new temperature setpoint, as indicated generally by block 170. If, for example, the thermostat controller receives a command from the user to increase the temperature during the active setup command, the thermostat controller can infer that the user is uncomfortable and desires more rapid heating. The thermostat controller can then either immediately activate the auxiliary heating stage or decrease the time in which the system delays activation. Conversely, if the thermostat controller receives a command from the user to decrease the temperature during the active setup command, the thermostat controller can infer that the user is not as concerned with a rapid increase in temperature. In such situation, the thermostat controller can then either further delay activation of the auxiliary heating stage or suppress such activation altogether.

In some embodiments, the thermostat controller can be configured to adjust the rate of heating based on the number of setpoint changes made, the duration or time between each setpoint change, the number of times a setback temperature is selected soon after a higher temperature setpoint is selected, and/or the magnitude or direction of temperature changes made. If, for example, the thermostat controller is equipped with a keypad for inputting temperature setpoint changes, the controller can be configured to adjust the target time based on the time between key presses. In some cases, the inputs or commands received during the current setup condition can be compared against previously stored values to adjust the target time to reach the temperature setpoint in a particular manner. If, for example, the duration of time between key presses is less than in previous setpoint changes, the temperature controller can infer that the user desires more rapid heating, turning on the auxiliary heating stage either immediately or with less of a delay.

In some embodiments, and as further shown generally by block 172, the thermostat controller can also be configured to adjust the target time parameter based on the sensed temperature outside of the building. During periods of cold weather, for example, the thermostat controller can be configured to reduce the delay time in which the auxiliary heating stage activates, or, alternatively if delayed activation is inefficient, cause the auxiliary heating stage to immediately turn on. If desired, other conditions such as indoor humidity, outdoor humidity, ventilation rate, the number of air changeovers per hour, etc. can be used by the thermostat controller in adjusting the target time to achieve the temperature setpoint.

At any stage during the process, and as indicated generally by decision block 174, the economy mode of operation can be overridden either manually or automatically, causing one or more auxiliary heating stages to activate until the sensed temperature within the building is at or above the new temperature setpoint at block 176. Once the new temperature setpoint has been achieved, the thermostat controller can then be configured to repeat the above steps to adjust the temperature based on any new setpoints received, if desired.

Figure 10:
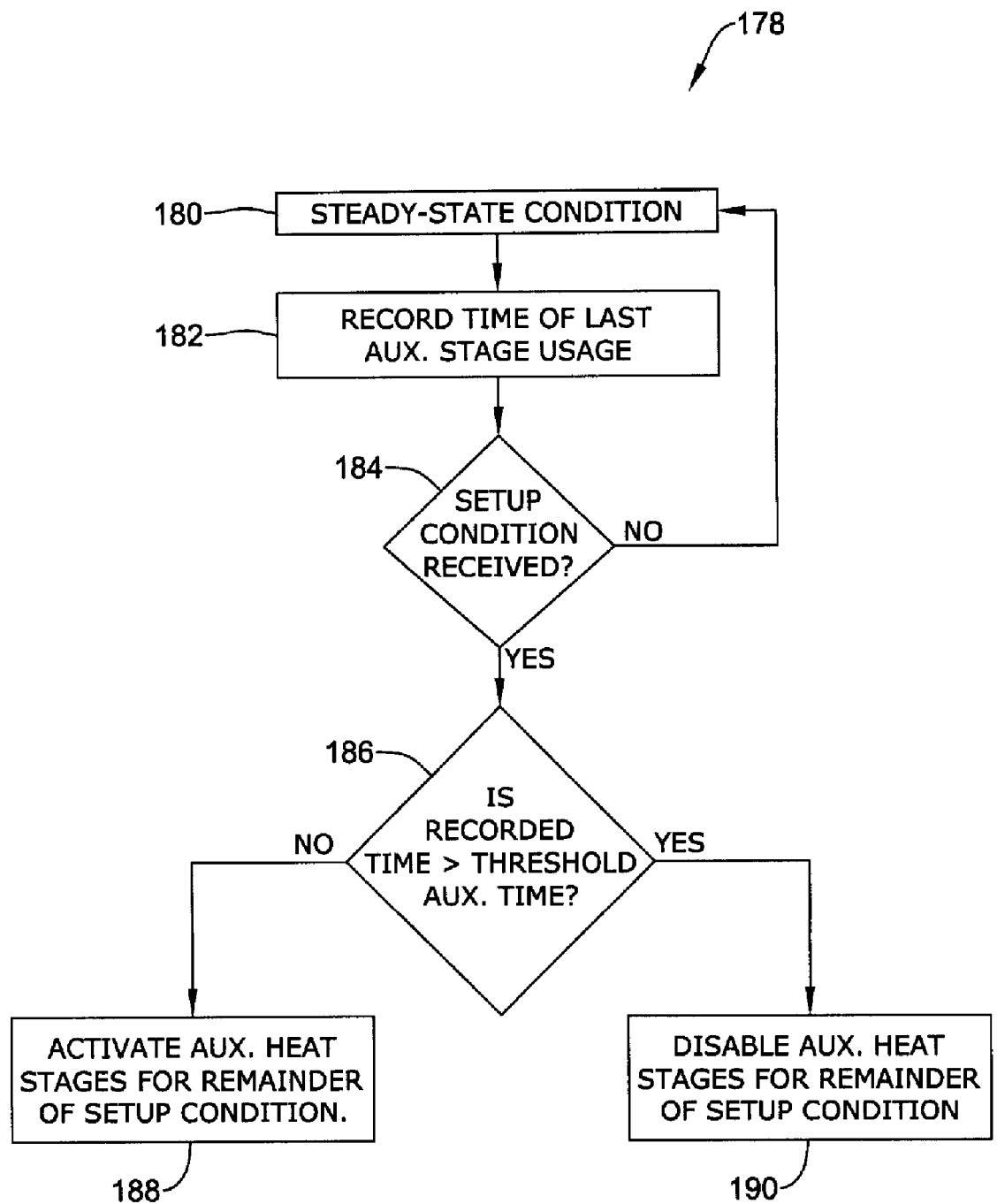
FIG. 10 is a block diagram showing an illustrative method of controlling a multistaged HVAC system in an economy mode of operation based in part on prior auxiliary heating stage usage information.

FIG. 10 is a block diagram showing an illustrative method 178 of controlling a multistaged HVAC system in an economy mode of operation based in part on prior auxiliary heating stage usage information. As shown in FIG. 10, method 178 may begin at block 180 with the operation of the HVAC system in a steady-state condition with either continuous or intermittent activation of the primary heating stage. In such state, the thermostat controller can be configured to cycle the primary heating stage on and off to maintain a desired temperature within the building or structure based on input from a user and/or another controller.

Once the auxiliary heating stages have completed at least one heating cycle, an internal timer within the thermostat controller can record the time in which the last auxiliary heating stage cycle ended, as indicated generally by block 182. If a setup condition is received at decision block 184, the thermostat controller can be configured to compare the time elapsed between the last completed auxiliary heating cycle against a threshold time period to determine whether there has been any recent auxiliary stage usage. If at block 186 the thermostat controller determines that the time elapsed is less than the threshold time period, the controller deduces that the auxiliary heating stage has been required to maintain steady stage conditions and activates the auxiliary heating stages for the remainder of the setup condition, as indicated generally by block 188. If, however, the thermostat controller determines that the time elapsed is at or greater than the threshold time period, the controller deduces that auxiliary heating is not required to maintain steady state conditions and thus operates in the economy mode by disabling the auxiliary heating stage for the remainder of the setup condition, as indicated generally by block 190.

Figure 11:
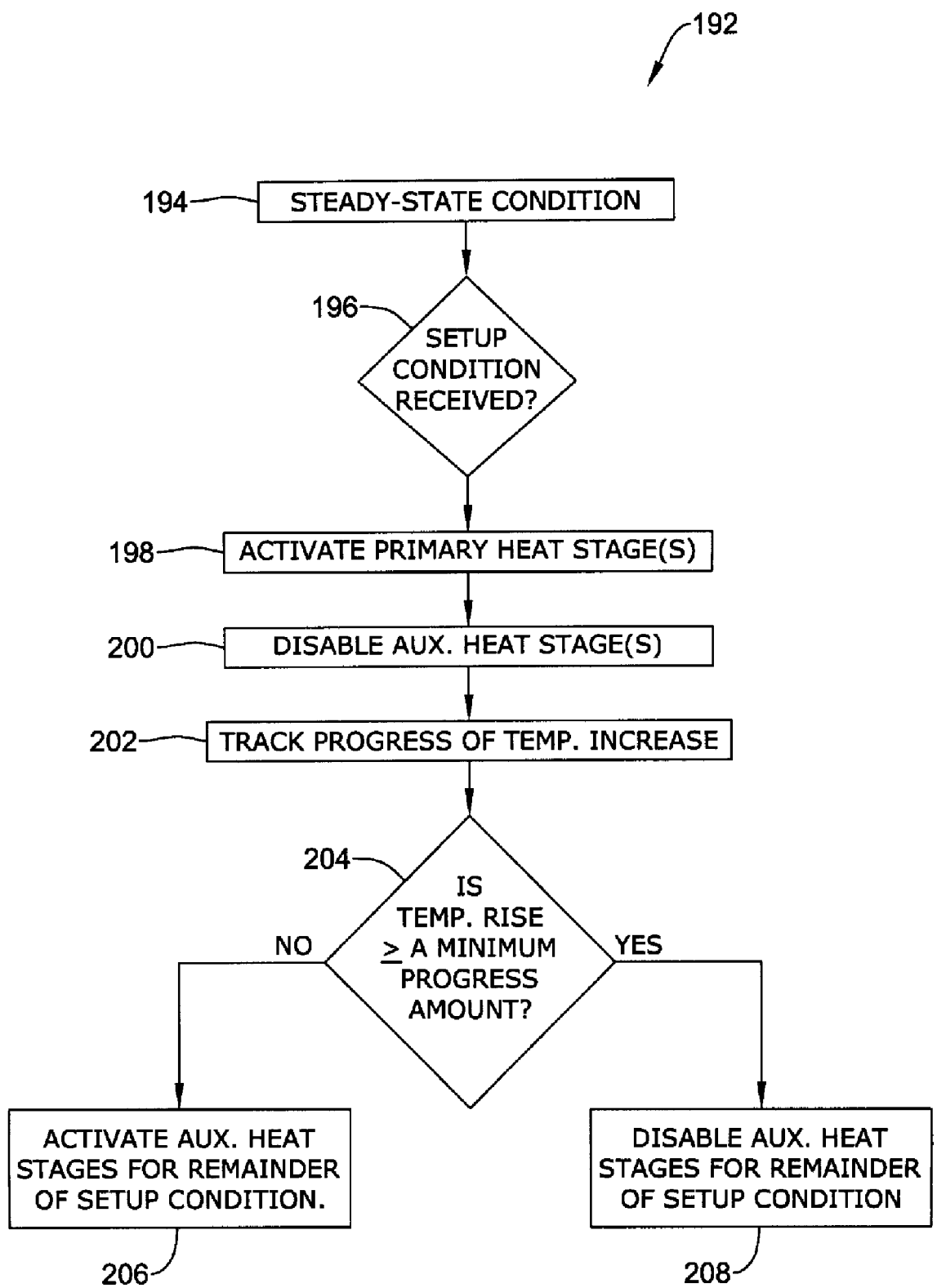
FIG. 11 is a block diagram showing an illustrative method of controlling a multistaged HVAC system in an economy mode of operation based in part on progress information.

FIG. 11 is a block diagram showing an illustrative method 192 of controlling a multistaged HVAC system in an economy mode of operation based in part on progress information. As shown in FIG. 11, method 192 may begin at block 194 with the operation of the HVAC system in a steady-state condition with either continuous or intermittent activation of the primary heating stage. In such state, the thermostat controller can be configured to cycle the primary heating stage on and off to maintain a desired temperature within the building or structure based on input from a user and/or another controller.

A setup condition received at block 196 can cause the system to activate the primary heating stages and disable the auxiliary heating stages, as indicated, respectively, at blocks 198 and 200. With the auxiliary heating stages disabled, the thermostat controller can then be configured to track the initial progress of the temperature increase by comparing the change in the temperature sensed within the building or structure over a predetermined time period, as indicated generally at block 202. In some embodiments, for example, the thermostat controller can be configured to measure the change in sensed temperature over a 30 minute time period, and then compute a temperature rise parameter that can be used to determine the target time required to reach the new setpoint condition without activation of the auxiliary heating stages.

If at decision block 204 the temperature rise parameter is less than a minimum progress parameter stored within the thermostat controller, the controller can then activate the auxiliary heating stages for the remainder of the setup condition to provide the additional heating capacity, as indicated generally at block 206. Conversely, if the temperature rise parameter is greater than or equal to the minimum progress parameter, the thermostat controller can then delay or suppress the operation of the auxiliary heating stages in order to conserve energy, as indicated generally at block 208.

Having thus described the several embodiments of the present invention, those of skill in the art will readily appreciate that other embodiments may be made and used which fall within the scope of the claims attached hereto. Numerous advantages of the invention covered by this document have been set forth in the foregoing description. It will be understood that this disclosure is, in many respects, only illustrative. Changes can be made with respect to various elements described herein without exceeding the scope of the invention.

What is claimed is:

1. A method of controlling an HVAC system installed within a building or structure, the HVAC system including a primary stage and an auxiliary stage, and a multistage controller for controlling the primary stage and the auxiliary stage to achieve a temperature within the building or structure that is in accordance with a currently active temperature setpoint, the multistage controller having a user interface that allows a user to make a change to the currently active temperature setpoint resulting in a changed currently active temperature setpoint, whereby the multistage controller then controls the primary stage and the auxiliary stage to achieve a temperature within the building or structure that is in accordance with the changed currently active temperature setpoint, the method comprising the steps of:

receiving a change to the currently active temperature setpoint from a user via the user interface of the multistage controller, wherein the change is not part of a programmed schedule, the change resulting in a changed currently active temperature setpoint;

controlling the primary stage and the auxiliary stage to achieve a temperature within the building or structure that is in accordance with the changed currently active temperature setpoint at or near a target time after receiving the change to the currently active temperature setpoint, the controlling step including:

sensing the temperature within the building or structure;

activating the primary stage if the sensed temperature is different from the changed currently active temperature setpoint;

determining the target time to reach the changed currently active temperature setpoint; and achieving the changed currently active temperature setpoint at or near said target time while delaying or suppressing activation of the auxiliary stage, wherein the controlling step is initiated upon receiving the change to the currently active temperature setpoint from the user.

2. The method of claim 1, wherein said step of determining the target time to achieve the changed currently active temperature setpoint is accomplished at least in part using a table of times versus temperatures stored within a memory unit of the multistage controller.

3. The method of claim 1, wherein said step of determining the target time to achieve the changed currently active temperature setpoint is accomplished at least in part using feedback from an exterior temperature sensor.

4. The method of claim 1, wherein said step of determining a target time to achieve the temperature setpoint is based at least in part on the past usage characteristics of the auxiliary stage.

5. The method of claim 1, wherein said step of determining the target time to achieve the changed currently active temperature setpoint includes the steps of:

computing a setup amount parameter representing the difference between the changed currently active temperature setpoint and the sensed temperature within the building or structure; and computing an auxiliary ramp rate parameter representing an estimate of the heating or cooling capacity of both the primary and auxiliary stages.

6. The method of claim 5, further comprising the step of activating the auxiliary stage if the current sensed temperature within the building or structure is less than or equal to a crossover temperature point determined from the auxiliary ramp rate parameter.

7. The method of claim 1, further comprising the steps of:
activating the primary stage once the temperature setpoint is received;
sensing the temperature change within the building or structure over a period of time; and
comparing the temperature change parameter against a minimum progress parameter and activating the auxiliary stage if said temperature change parameter is less than said minimum progress parameter.

8. The method of claim 1, wherein the multistage thermostat controller is adapted to adjust the target time based at least in part on user input made subsequent to receiving said temperature setpoint.

9. The method of claim 1, further comprising the steps of:
determining whether at least one setback change has been made prior to achieving said temperature setpoint; and
adjusting the target time earlier or later based at least in part on said at least one setback change.

10. The method of claim 9, further comprising the step of adjusting the target time based at least in part on the number of setback changes made.

11. The method of claim 9, further comprising the step of adjusting the target time based at least in part on the time between two or more setback changes.

12. The method of claim 9, further comprising the step of adjusting the target time based at least in part on the magnitude or direction of said at least one setback change.

13. The method of claim 1, wherein said primary and auxiliary stages are each heating stages.

14. The method of claim 1, wherein said primary and auxiliary stages are each cooling stages.

15. The method of claim 1, wherein said multistage controller is a non-programmable thermostat.

16. The method of claim 1, wherein said multistage controller is a programmable thermostat.

17. A multistage thermostat for controlling an HVAC system installed within a building or structure, the HVAC system including a primary stage and an auxiliary stage, said multistage thermostat comprising:
a processor including a control algorithm adapted to run the multistage thermostat in either of two separate modes of operation, a normal mode of operation for achieving rapid temperature changes within the building or structure after a change to a currently active temperature setpoint is received, or an economy mode of operation for conserving energy usage of the auxiliary stage after a change to a currently active temperature setpoint is received, wherein the processor in the economy mode of operation determines a target time from the time a change to the currently active temperature setpoint is received from the user, wherein the change is not part of a programmed schedule, wherein the target time is for achieving a temperature within the building or structure that is consistent with the changed currently active temperature setpoint while delaying or suppressing activation of the auxiliary stage; and
a user interface for receiving temperature setpoint changes from a user, including changes to the currently active temperature setpoint resulting in a changed currently active temperature setpoint.

18. The multistage thermostat of claim 17, wherein the multistage thermostat in said normal mode of operation immediately activates the auxiliary stage in response to receiving the change to the currently active temperature setpoint.

19. The multistage thermostat of claim 17, wherein the multistage thermostat in said economy mode of operation delays or suppresses activation of the auxiliary stage in response to receiving the change to the currently active temperature setpoint.

20. The multistage thermostat of claim 17, further comprising a memory unit for storing data regarding past usage characteristics of the primary and/or auxiliary stages and the changes to the currently active temperature setpoint.

21. The multistage thermostat of claim 17, wherein said multistage thermostat is a non-programmable thermostat.

22. The multistage thermostat of claim 17, wherein said multistage thermostat is a programmable thermostat.

23. The multistage thermostat of claim 17, wherein said primary stage comprises a heat pump.

24. The multistage thermostat of claim 17, wherein said auxiliary stage comprises an electrical resistance strip.

25. A multistage thermostat for controlling an HVAC system installed within a building or structure, the HVAC system including a primary stage and an auxiliary stage, said multistage thermostat comprising:
a processor including a control algorithm adapted to run the multistage thermostat in either a normal mode of operation for achieving rapid temperature changes within the building or structure after a change to a currently active temperature setpoint is received, or an economy mode of operation for conserving energy usage of the auxiliary stage after a change to a currently active temperature setpoint is received, wherein the multistage thermostat does not have a programmable schedule, wherein the processor in the economy mode of operation determines a target time from the time a change to the currently active temperature setpoint is received, for achieving a temperature within the building or structure that is consistent with the changed currently active temperature setpoint while delaying or suppressing activation of the auxiliary stage; and
a user interface for receiving temperature setpoint changes from a user, including changes to the currently active temperature setpoint resulting in a changed currently active temperature setpoint.

* * * * *

UNITED STATES PATENT AND TRADEMARK OFFICE
CERTIFICATE OF CORRECTION

PATENT NO. : 7,644,869 B2  
APPLICATION NO. : 11/306427  
DATED : January 12, 2010  
INVENTOR(S) : Hoglund et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 722 days.

Signed and Sealed this

Sixteenth Day of November, 2010

David J. Kappos  
*Director of the United States Patent and Trademark Office*